United States Patent
Beissinger (10) Patent No.: US 9,405,389 B2
(45) Date of Patent: Aug. 2, 2016

(54) NOISE REDUCTION THROUGH DEMOCRATIC ALPHA SMOOTHING

(71) Applicant: Microsoft Technology Licensing, LLC, Redmond, WA (US)

(72) Inventor: Peter Beissinger, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/473,919

(22) Filed: Aug. 29, 2014

(65) Prior Publication Data
US 2016/0062493 A1    Mar. 3, 2016

(51) Int. Cl.
*G06F 3/041* (2006.01)
*G06F 17/18* (2006.01)

(52) U.S. Cl.
CPC .............. *G06F 3/041* (2013.01); *G06F 17/18* (2013.01)

(58) Field of Classification Search
CPC ......... G06F 3/023; G06F 3/0237; G06F 3/03; G06F 3/0354; G06F 3/038
See application file for complete search history.

(56) References Cited

U.S. PATENT DOCUMENTS

| | | | |
|---|---|---|---|
| 6,782,297 B2 * | 8/2004 | Tabor | G05B 23/0221 700/52 |
| 8,010,382 B2 | 8/2011 | Chua et al. | |
| 8,406,476 B2 | 3/2013 | Wu et al. | |
| 8,566,483 B1 | 10/2013 | Chen et al. | |
| 8,645,527 B1 | 2/2014 | Lee et al. | |
| 8,712,769 B2 | 4/2014 | Song et al. | |
| 2007/0233435 A1 | 10/2007 | Bradski | |
| 2009/0066673 A1 | 3/2009 | Molne et al. | |

OTHER PUBLICATIONS

Dai, et al., "Variable Step-size NLMS and Affine Projection Algorithms with Variable Smoothing Factor", In Proceedings of 48th Midwest Symposium on Circuits and Systems, Aug. 7, 2005, 3 pages.

Burgstahler, et al., "New modifications of the exponential moving average algorithm for bandwidth estimation", Proceedings of the 15th ITC Specialist Seminar on Internet Traffic Engineering and Traffic Management, Jul. 2002, pp. 210-219.

PCT Search Reported mailed Oct. 20, 2015, for PCT Application No. PCT/US2015/046625, 10 pages.

* cited by examiner

*Primary Examiner* — Olga Merkoulova
(74) *Attorney, Agent, or Firm* — Lee & Hayes, PLLC (57) ABSTRACT

An iterative exponential moving average algorithm generates a smoothed output data stream from a noisy input data stream. A smoothing factor used in calculating the exponential moving average is updated with each iteration of the exponential moving average algorithm based on a cumulative vote value, which is based, at least in part, on an estimated state of the input data stream.

20 Claims, 9 Drawing Sheets

NOISE REDUCTION THROUGH DEMOCRATIC ALPHA SMOOTHING

BACKGROUND

There are many environments in which a large amount of data may be gathered. In many cases, the data that is gathered is considered noisy, and a smoothed version of the data is desirable. For example, such smoothing may be desired when analyzing financial data such as stock prices, returns, or trading volumes, or economic data such as gross domestic product or employment statistics. As another example, a computer system that utilizes touch or gestures to receive user input may gather many data points as the user interacts with the system. Various sources of noise may affect the data that is gathered. For example, such a computer system may include a digitizer to convert analog touch or gesture data to digital data. Depending on the type of digitizer used, the digitizer may introduce varying degrees of noise.

Exponential Moving Average (EMA) is a recursive function that takes a weighted average of all sampled data points using a constant smoothing factor, $\alpha$, having a value between zero and one. The most recently sampled data point is multiplied by the constant, $\alpha$, and previously sampled data points are multiplied by successive powers of $\alpha$. Because $\alpha$ is typically less than one, powers of $\alpha$ can quickly drop to negligible fractional percentages. In this way, less recent data points decay to negligible values quickly.

The value selected for $\alpha$ can significantly influence the results of data smoothing using EMA. When $\alpha$ is near one, the smoothed output is nearly the same as the raw input. When $\alpha$ is near zero, the smoothed output has high latency and responds weakly to changes in input trends.

SUMMARY

Democratic alpha smoothing is described. As each sampled data value is received from an input data stream, a state of the input data stream is estimated. A total vote value is updated based on the estimated state of the input data stream, and a smoothing factor is calculated based on the updated total vote value. An iteration of an exponential moving average is calculated using the smoothing factor to produce a data value of a smoothed output data stream.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the drawings to reference like features and components.

DETAILED DESCRIPTION

The following discussion is directed to democratic alpha smoothing. Exponential Moving Average (EMA) is a recursive algorithm that takes a weighted average of all sampled data points, generating output with reduced noise. A weight, $\alpha$, is multiplied by the most recently sampled data point, and successive powers of $\alpha$ are multiplied by less recently sampled data points. When $\alpha$ is near one, the smoothed output is nearly the same as the raw input. When $\alpha$ is near zero, the smoothed output has high latency and responds weakly to changes in input trends.

The EMA algorithm is given as:

$$S_n = \alpha * z_n + (1-\alpha) * S_{n-1}$$

where:
 $S_n$ is the n-th smooth estimate.
 $z_n$ is the n-th measured value.
 $\alpha=[0,1]$ is a unit-less constant.
 $S_1 = z_1$.

Rather than relying on a single value of $\alpha$, democratic alpha smoothing dynamically changes $\alpha$ at run-time based on whether high fidelity or high smoothness would produce more accuracy. In the described example implementation, upon each iteration of the EMA algorithm, a democratic alpha smoothing system estimates a state of the input data stream, and determines an $\alpha$ value to be used in calculating the exponential moving average. The democratic alpha smoothing system classifies the state of the input stream as either "trending," meaning the data is generally rising or falling, or "flickering," meaning the data is generally dancing about approximately the same value. If the system is in a trending state, a higher value of $\alpha$ will decrease latency. If the system is in a flickering state, a lower value of $\alpha$ will more effectively decrease the noise.

Figure 1:
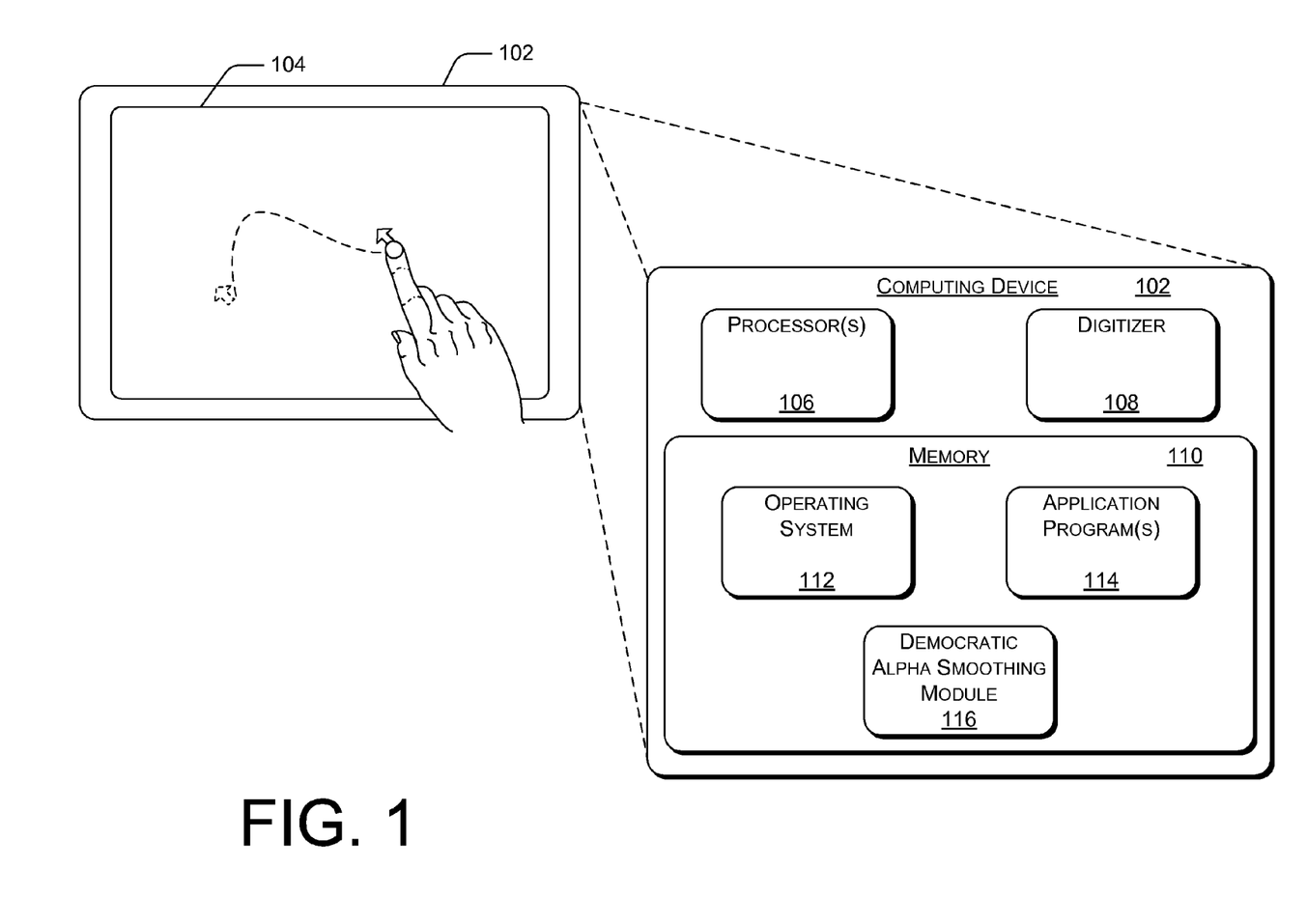
FIG. 1 is a pictorial diagram of an example computing environment that implements democratic alpha smoothing, including select components of an example computing device.

FIG. 1 illustrates an example computing environment in which democratic alpha smoothing may be implemented. In the illustrated example, a computing device 102 includes a touch or gesture-based interface 104. As a user moves their finger across the interface 104, computing device 102 may generate data to indicate, for example, a speed at which the user's finger is moving across the interface 104.

In the illustrated example, computing device 102 includes one or more processors 106, a digitizer 108, and memory 110. Example digitizer 108 converts analog data associated with the user's touch or gesture interaction with the interface 104 to digital data. Any of the hardware components of computing device 102 may introduce noise as data is gathered. For example, depending on the specific digitizer implementation, the digitizer may introduce varying levels of noise when converting the analog touch or gesture data to digital data.

An operating system 112 and one or more application programs 114 may be stored in memory 110 and executed on processor 106. Democratic alpha smoothing module 116 is also stored in memory 110, either as a stand-alone module or as a component of either operating system 112 or of an application 114, and is executed by the processor(s) 106. Democratic alpha smoothing module 116 applies a smoothing algorithm to the input data generated by the digitizer 108, lessening the effect of any noise that the digitizer may have introduced.

Although illustrated and described in the context of a single computing device, the functionality of the democratic alpha smoothing module described herein may alternatively be implemented in a client-server architecture, with the democratic alpha smoothing module residing at either the client, the server, or distributed across both the client and server.

Alternatively, or in addition, the functionality of the democratic alpha smoothing module described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Although illustrated in FIG. 1 as being stored in memory 110 of computing device 102, democratic alpha smoothing module 116, or portions thereof, may be implemented using any form of computer-readable media that is accessible by computing device 102 either locally or remotely, including over a network. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Furthermore, although illustrated and described in the context of input data generated by a digitizer in response to touch or gesture input, democratic alpha smoothing as described herein may be applied to any type of data. Examples of other types of data include, but are not limited to, input data generated through natural user interface technologies such as speech recognition, touch and stylus recognition, gesture recognition, air gestures, head and eye tracking, voice and speech, vision, touch, hover, and machine intelligence. Democratic alpha smoothing may be applied in any context that may benefit from calculating an exponential moving average. Other examples of input data to which democratic alpha smoothing may be applied include, but are not limited to, financial data such as stock prices, returns, or trading volumes, and economic data such as gross domestic product or employment statistics.

Figure 2:
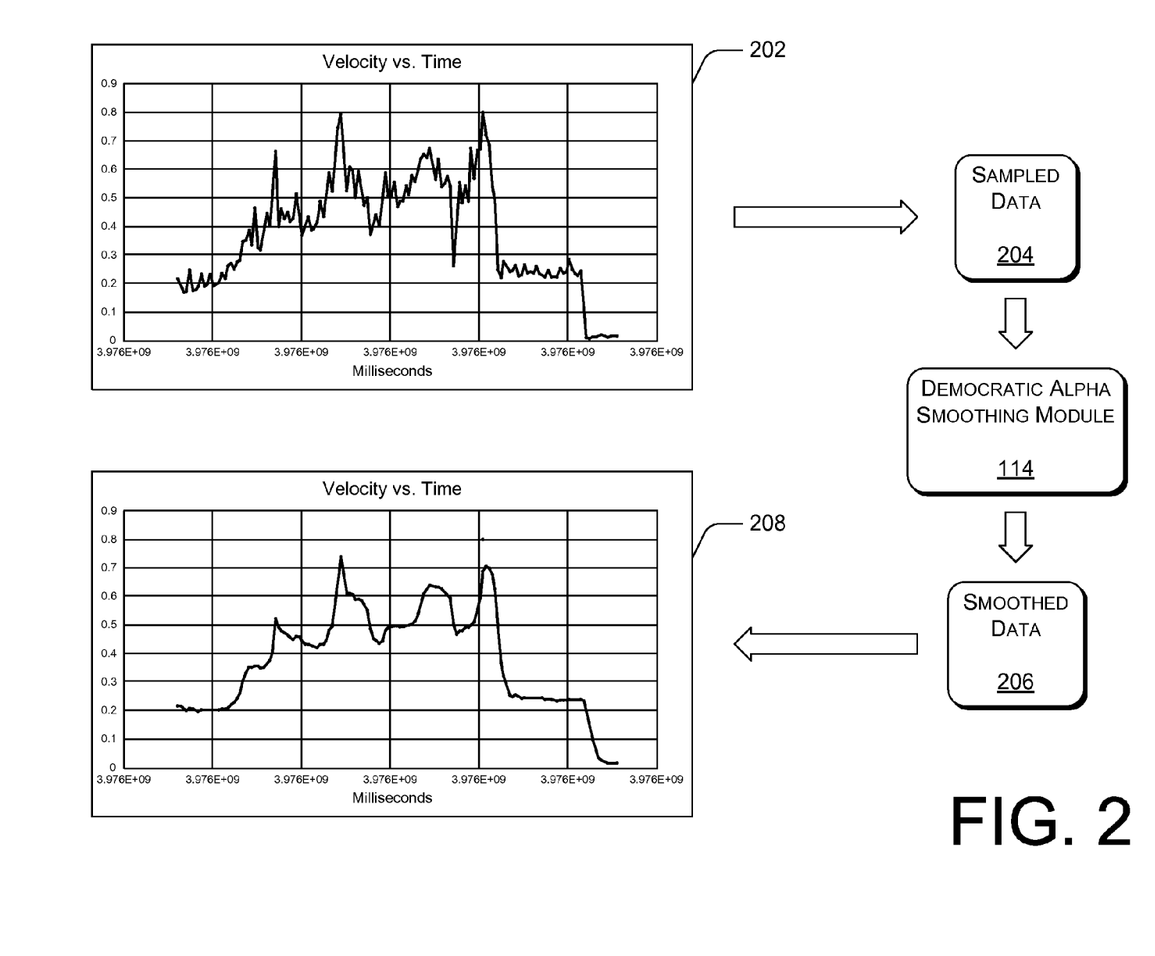
FIG. 2 is a pictorial diagram of example input data and corresponding example output data resulting from democratic alpha smoothing.

FIG. 2 illustrates example input data 202, which represents a speed at which a user's finger is moving across an input device over a period of time. Sampled data 204 is taken from the input data 202 and processed by the democratic alpha smoothing module 114, resulting in smoothed data 206. Example output data 208 is a smoothed representation of the original input data 202. As can be seen in FIG. 2, the smoothed data includes less noise than the original input data.

Figure 3:
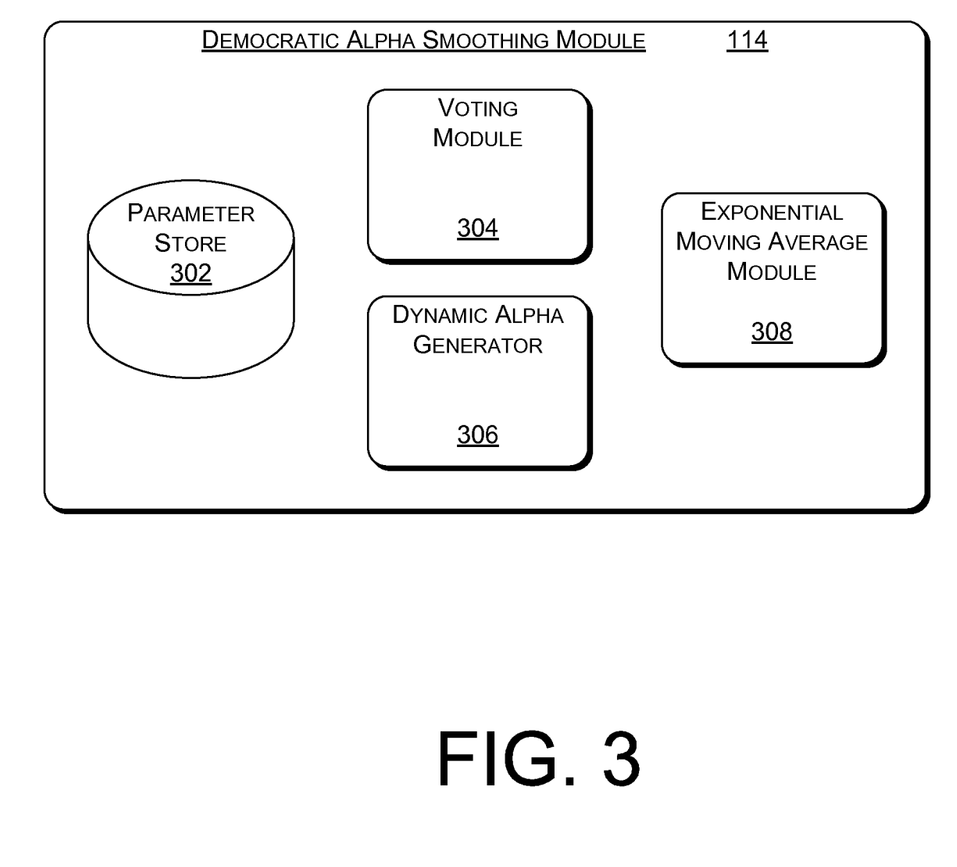
FIG. 3 is a block diagram of selected components of an example democratic alpha smoothing module.

FIG. 3 illustrates select components of an example democratic alpha smoothing module 114. As illustrated in FIG. 3, example democratic alpha smoothing module 114 includes parameter store 302, voting module 304, dynamic alpha generator 306, and exponential moving average module 308. Parameter store 302 maintains various constants that may be used to tune the democratic alpha smoothing module 114. Voting module 304 increases or decreases a cumulative total vote value based on an estimated state of the input data stream. Dynamic alpha generator 306 dynamically modifies the value of the smoothing factor, $\alpha$, based on the total vote value. Exponential moving average module 308 calculates an exponential moving average based, at least in part, on the dynamically modified smoothing factor.

Figure 4:
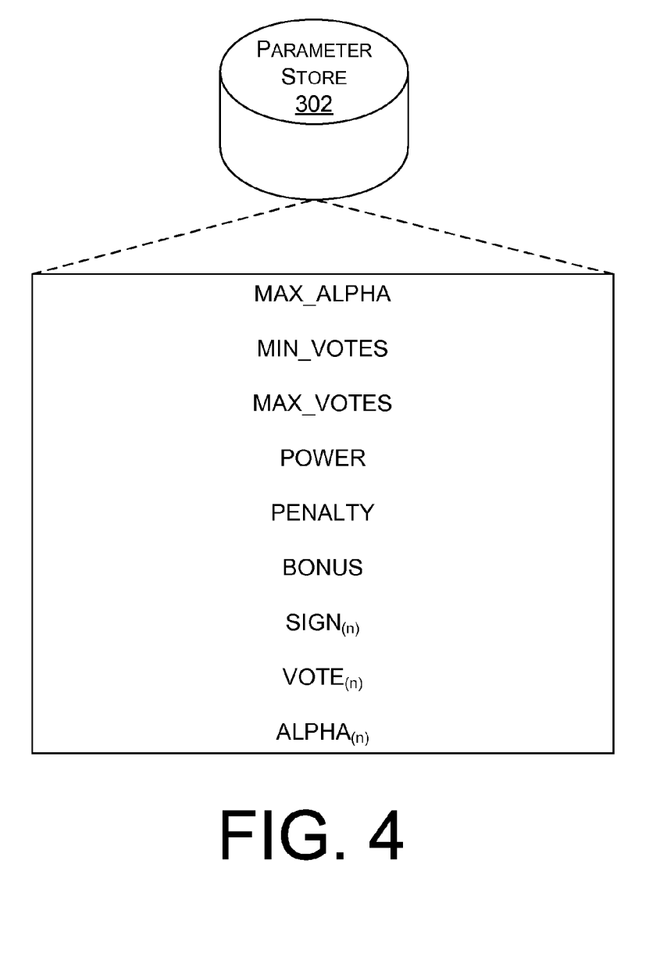
FIG. 4 is a block diagram illustrating a parameter store associated with an example democratic alpha smoothing module and example values that the parameter store may maintain.

FIG. 4 illustrates example constants that may be maintained by the parameter store 302. In the illustrated example, parameter store 302 includes values for MAX_ALPHA, MIN_VOTES, MAX_VOTES, POWER, PENALTY, BONUS, $SIGN_{(n)}$, $VOTE_{(n)}$, and $\alpha_{(n)}$.

In an example implementation, MAX_ALPHA defines a maximum value for $\alpha$. As discussed above, according to the standard EMA algorithm, $\alpha=[0,1]$. Applying the EMA algorithm with $\alpha$ equal to zero results in output data in which each data point is equal to the previous data point. Applying the exponential moving average algorithm with $\alpha$ equal to one results in output data in which no smoothing occurs and each output data point is equal to the input data point. Accordingly, for democratic alpha smoothing, in which the value of $\alpha$ dynamically changes with each iteration of the EMA algorithm, a smaller range of $\alpha$ may be defined to prevent $\alpha$ from being equal to either zero or one. The upper end of this smaller range is defined using MAX_ALPHA. The lower end of this smaller range for values of $\alpha$ can be calculated based on MIN_VOTES, as is explained in further detail below.

MIN_VOTES and MAX_VOTES define a range of vote values that will affect the value of $\alpha$. When a current vote total is equal to MIN_VOTES, $\alpha$ will have its smallest value. Similarly, when a current vote total is equal to MAX_VOTES, $\alpha$ is equal to MAX_ALPHA.

POWER is a customizable constant that determines a degree of linearity with which the value of $\alpha$ moves from its minimum value to MAX_ALPHA as the total vote value moves from MIN_VOTES to MAX_VOTES. If POWER equals one, the value of $\alpha$ moves from its minimum value to MAX_ALPHA linearly as the total vote value moves from MIN_VOTES to MAX_VOTES. If POWER is less than one, $\alpha$ increases quickly as the vote total increases from MIN_VOTES, and $\alpha$ increases more slowly as the vote total approaches MAX_VOTES. Conversely, if POWER is greater than one, $\alpha$ increases slowly as the vote total increases from MIN_VOTES, and $\alpha$ increases more quickly as the vote total approaches MAX_VOTES.

PENALTY defines a degree to which a flickering state affects the total vote value. For example, when it is determined that the input data stream is in a trending state, the total vote value may be increased by one, but when it is determined that the input data stream is in a flickering state, the total vote value may be decreased by two. In an example implementation, PENALTY may be a dynamic variable that is based, at least in part, on the current estimated state of the input data stream. For example, if it is estimated that the input data stream is consistently in a flickering state, PENALTY may be equal to one. However, if it is estimated that the input data stream has just switched from a trending state to a flickering state, PENALTY may be equal to a value greater than one.

BONUS defines a degree to which a trending state affects the total vote value. As with the PENALTY parameter, the BONUS parameter for increasing the total vote value may be static or dynamic. For example, if it is estimated that the input data stream is consistently trending, BONUS may be equal to one. However, if it is estimated that the input data stream has just moved from a flickering state to a trending state, BONUS may be equal to a value larger than one.

$SIGN_{(n)}$ indicates whether calculating a difference between $z_{(n)}$ and $S_{(n-1)}$ is positive or negative.

$VOTE_{(n)}$ indicates the total number of votes, restricted to a range defined by MIN_VOTES and MAX_VOTES.

$ALPHA_{(n)}$, or $\alpha_{(n)}$, indicates the value of $\alpha$ to be used in calculating the exponential moving average of $z_{(n)}$. $ALPHA_{(n)}$ is restricted to a range that is based on MIN_VOTES and MAX_VOTES. The largest value of $ALPHA_{(n)}$ is defined by MAX_ALPHA.

Figure 5:
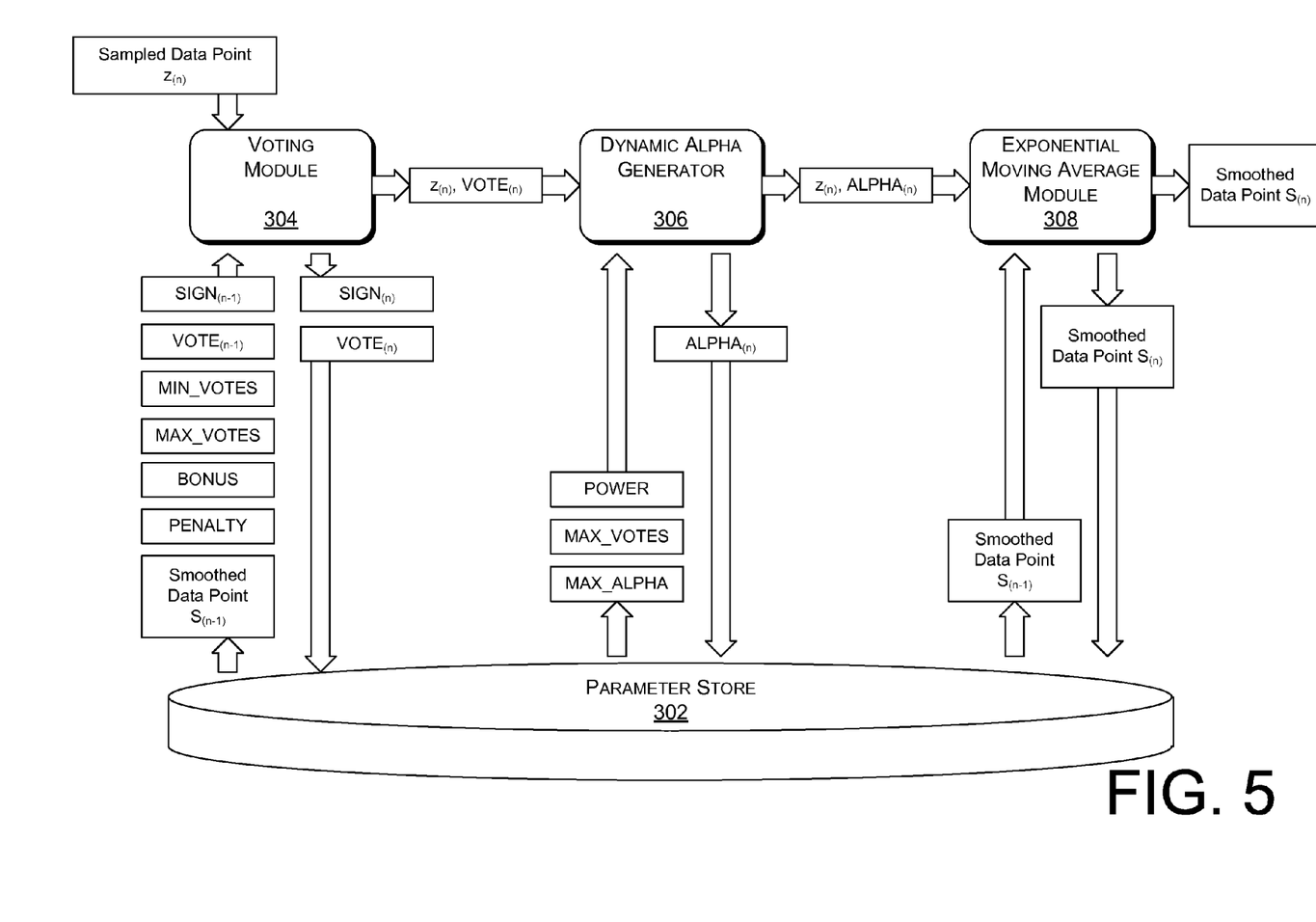
FIG. 5 is a block diagram of an example data flow among components of an example democratic alpha smoothing module.

FIG. 5 illustrates an example data flow through select components of the democratic alpha smoothing module 114. In the illustrated example, as an input data stream is received, voting module 304 receives a sampled data point 502. Voting module 304 utilizes the received sampled data point, the previously smoothed data point ($S_{(n-1)}$), PENALTY, BONUS, MAX_VOTES, MIN_VOTES, the previous vote value ($VOTE_{(n-1)}$), and the previous sign ($SIGN_{(n-1)}$) to determine a new sign ($SIGN_{(n)}$) and a new vote total ($VOTE_{(n)}$). In the illustrated example, parameter store 302 maintains and provides access to $S_{(n-1)}$, PENALTY, BONUS, MAX_VOTES, MIN_VOTES, $VOTE_{(n-1)}$, and $SIGN_{(n-1)}$. Voting module 304 outputs $SIGN_{(n)}$ and $VOTE_{(n)}$ to the parameter store, and outputs $VOTE_{(n)}$ along with the sampled data point $z_{(n)}$ to the dynamic alpha generator 306. In an example implementation, if PENALTY and/or BONUS are dynamic values, voting module 304 may also update one or both of PENALTY and/or BONUS and output the updated values to the parameter store 302.

Dynamic alpha generator 306 utilizes the received $VOTE_{(n)}$, POWER, MAX_VOTES, and MAX_ALPHA to determine a new $\alpha$ ($ALPHA_{(n)}$). In the illustrated example, parameter store 302 maintains and provides access to POWER, MAX_VOTES, and MAX_ALPHA. Dynamic alpha generator 306 outputs $ALPHA_{(n)}$ to the parameter store, and outputs $ALPHA_{(n)}$ along with the sampled data point $z_{(n)}$ to the exponential moving average module 308.

Exponential moving average module 308 utilizes the received sampled data point ($z_{(n)}$), the previously smoothed data point ($S_{(n-1)}$), and $ALPHA_{(n)}$) to calculate a new smoothed data point ($S_{(n)}$). In the illustrated example, parameter store 302 maintains and provides access to $S_{(n-1)}$. Exponential moving average module 308 outputs $S_{(n)}$ to the parameter store and outputs $S_{(n)}$ as the resulting smoothed data point.

FIGS. 6-9 illustrate an example process 600 for receiving input data and generating smoothed output data using democratic alpha smoothing. The process is illustrated as a set of operations shown as discrete blocks. The process may be implemented in any suitable hardware, software, firmware, or combination thereof. The order in which the operations are described is not to be construed as a limitation.

Figure 6:
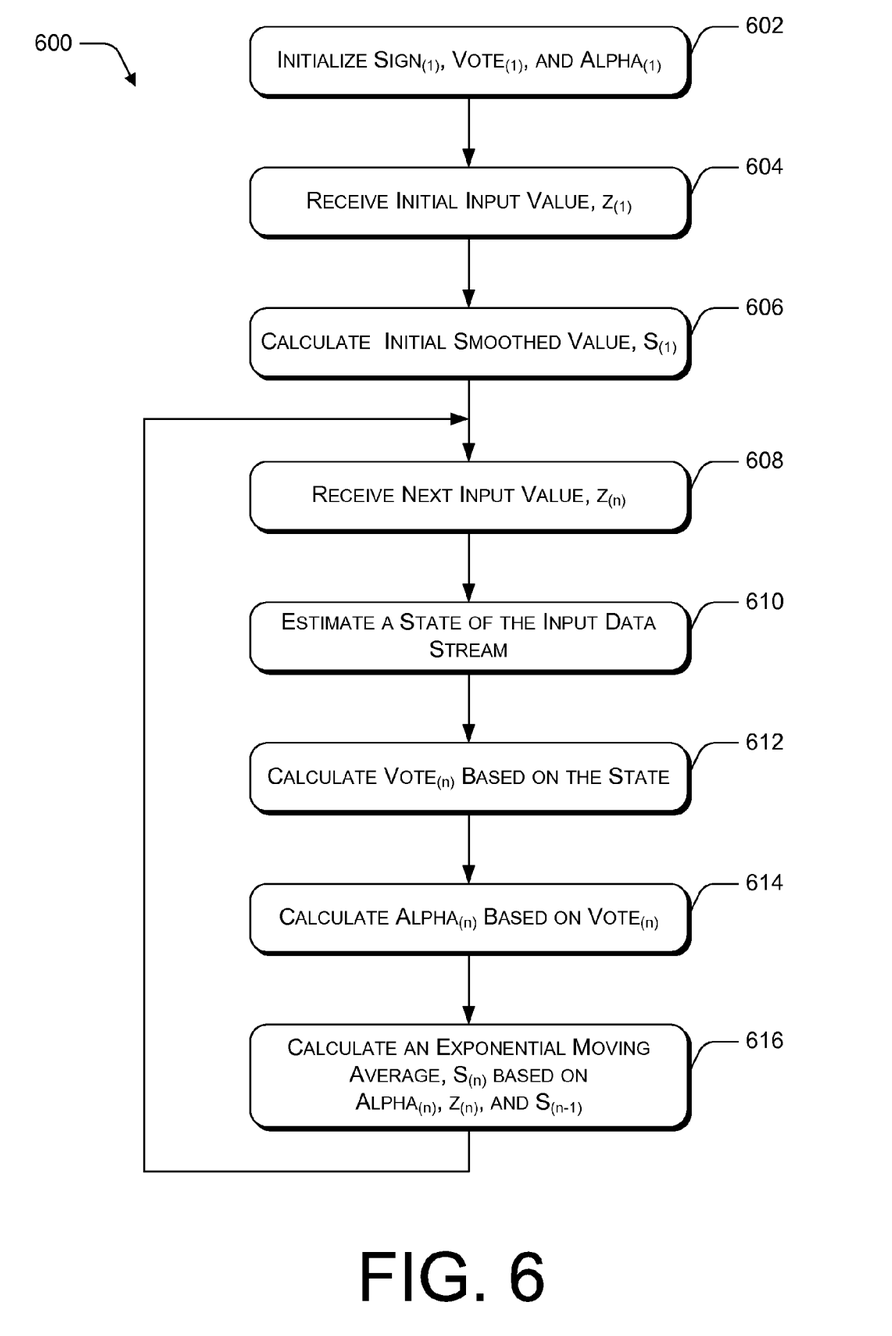
FIG. 6 is a flow diagram of an example method of receiving input data and generating smoothed output data using democratic alpha smoothing.

In FIG. 6, at block 602, democratic alpha smoothing module 116 initializes $SIGN_{(1)}$, $VOTE_{(1)}$, and $ALPHA_{(1)}$. In an example implementation, $SIGN_{(n)}$ is a Boolean variable that may be set to either "true" or "false" to indicate, respectively, whether or not a difference between a current sampled value ($z_{(n)}$) and a previously smoothed value ($S_{(n-1)}$) is greater than zero. $SIGN_{(1)}$ may be initialized to either true or false. In an example implementation, $VOTE_{(n)}$ represents a degree to which the input data stream appears to be trending, as opposed to flickering. $VOTE_{(1)}$ may be initialized to any value between MIN_VOTES and MAX_VOTES. In an example implementation, $VOTE_{(1)}$ is initialized to MIN_VOTES. $ALPHA_{(1)}$ may be initialized to any value between zero and MAX_ALPHA. In an example implementation, $ALPHA_{(1)}$ is initialized to a minimum value, based on:

$$\left(\frac{MIN\_VOTES}{MAX\_VOTES} * MAX\_APLHA\right)^{POWER}.$$

At block 604, democratic alpha smoothing module 116 receives an initial input value $z_{(1)}$. For example, in the computing environment illustrated in FIG. 1, digitizer 108 generates a data stream as a user interacts with interface 104. The initial input value, $z_{(1)}$, is a first sampled data point from the digitizer-generated data stream.

At block 606, exponential moving average module 308 calculates an initial smoothed value $S_{(1)}$. In an example implementation, $S_{(1)}=z_{(1)}$.

At block 608, the democratic alpha smoothing module 116 receives a next input value $z_{(n)}$. For example, as digitizer 108 generates a digital data stream, voting module 304 receives the next sampled data point of the digital data stream.

At block 610, voting module 304 estimates a state of the input data stream. In an example implementation, voting module 304 estimates the state of the input data stream based, at least in part, on a difference between the current sampled data point, $z_{(n)}$, and the previously calculated smoothed data point, $S_{(n-1)}$. By the nature of EMA smoothing, if the actual value is moving in a direction, the smoothed value will typically lag behind it. That is, if the actual value is increasing (i.e., "trending up"), the smoothed value will typically be below it; if the actual value is decreasing (i.e., "trending down"), the smoothed value will typically be above it. Therefore, if the sampled values are consistently above or consistently below the smoothed values, the input data stream is probably in a trending state. Similarly, if the actual values are not consistently above or consistently below the smoothed values, but rather, randomly alternate above and below the smoothed values, the input data stream is probably in a flickering state. Additional details regarding estimating the state of the input data stream are discussed below with reference to FIG. 7.

At block 612, voting module 304 calculates $VOTE_{(n)}$ based on the determined state of the input data stream. In an example implementation, voting module 304 calculates $VOTE_{(n)}$ by increasing the value of $VOTE_{(n-1)}$ if the input data stream is determined to be in a trending state, and decreasing the value of $VOTE_{(n-1)}$ if the input data stream is determined to be in a flickering state. Additional details regarding calculating $VOTE_{(n)}$ are discussed below with reference to FIG. 8.

At block 614, dynamic alpha generator 306 calculates $ALPHA_{(n)}$ based on $VOTE_{(n)}$. In an example implementation, if $VOTE_{(n)}$ is greater than $VOTE_{(n-1)}$, then $ALPHA_{(n)}$ will be greater than $ALPHA_{(n-1)}$. Similarly, if $VOTE_{(n)}$ is less than $VOTE_{(n-1)}$, $ALPHA_{(n)}$ will be less than $ALPHA_{(n-1)}$. Additional details regarding calculating $ALPHA_{(n)}$ are discussed below with reference to FIG. 9.

At block 616, exponential moving average module 308 calculates the next exponential moving average value, $S_{(n)}$, based on $ALPHA_{(n)}$, $z_{(n)}$, and $S_{(n-1)}$. As discussed above, the EMA module implements the EMA algorithm:

$$S_n = \alpha_n * z_n + (1-\alpha_n) * S_{n-1}$$

Figure 7:
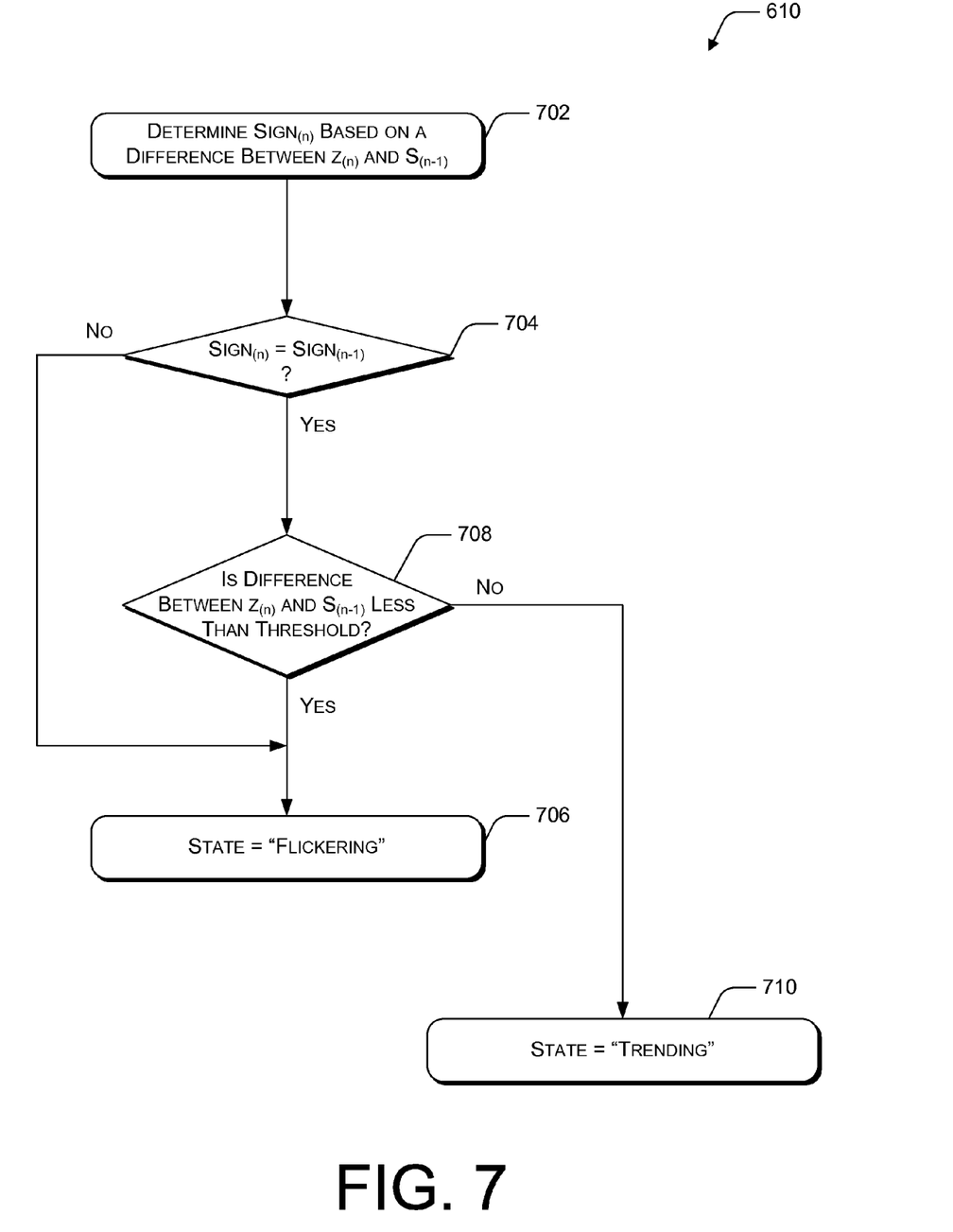
FIG. 7 is a flow diagram of an example method of estimating a state of an input data stream.

FIG. 7 illustrates an example process 610 for estimating a state of the input data stream. At block 702, voting module 304 determines $SIGN_{(n)}$ based on a difference between $z_{(n)}$ and $S_{(n-1)}$. In an example implementation:

$SIGN_{(n)}$=true if $z_{(n)}-S_{(n-1)}>0$ $SIGN_{(n)}$=false if $z_{(n)}-S_{(n-1)}\leq 0$.

At block 704, voting module 304 compares $SIGN_{(n)}$ to $SIGN_{(n-1)}$. If $SIGN_{(n)}$ and $SIGN_{(n-1)}$ are the same (i.e., both true or both false), then processing continues as described below with reference to block 708.

At block 706, when voting module 304 determines that $SIGN_{(n)}$ and $SIGN_{(n-1)}$ are not the same (i.e., one is true and the other is false), voting module 304 determines that the input data stream is in a state of "flickering." As discussed above, when the smoothed values are consistently above or consistently below the input data values, the input data stream is likely trending in an increasing or decreasing direction. However, if the smoothed values fluctuate between being above and being below the input data values, the input data stream is likely flickering around approximately the same value. A positive difference between $z_{(n)}$ and $S_{(n-1)}$ followed by a negative difference between $z_{(n)}$ and $S_{(n-1)}$ (or a negative difference followed by a positive difference) therefore likely indicates a state of flickering.

When voting module 304 determines that $SIGN_{(n)}$ and $SIGN_{(n-1)}$ are the same (the "Yes" branch from block 704), at block 708, voting module 304 performs another calculation to determine whether or not, even though $SIGN_{(n)}$ and $SIGN_{(n-1)}$ are the same, the input data stream may be in a state of flickering. As discussed above, in a trending state, the smoothed data values are consistently above or consistently below the input data values. However, it is possible that the input data stream has entered a flickering state if the smoothed data values are significantly close to the input data values, even though they may not have moved far enough to change the value of $SIGN_{(n)}$ compared to the value of $SIGN_{(n-1)}$. Accordingly, at block 708, voting module 304 determines whether the difference between $z_{(n)}$ and $S_{(n-1)}$ is less than a threshold value. In an example implementation, the threshold value is equal to 5% of $S_{(n-1)}$. In alternate implementations, other threshold values may be used, including, for example, a constant value. If it is determined that the difference between $z_{(n)}$ and $S_{(n-1)}$ is less than the threshold value, then as described above with reference to block 706, voting module 304 estimates that the input data stream is in a flickering state.

At block 710, when it is determined (in block 704) that $SIGN_{(n)}$ equals $SIGN_{(n-1)}$ and it is determined (in block 708) that the difference between $z_{(n)}$ and $S_{(n-1)}$ is greater than the threshold value, voting module 304 estimates that the input data stream is in a trending state.

In an alternate implementation, rather than determining and comparing $SIGN_{(n)}$ and $SIGN_{(n-1)}$, a state of the input data stream may be estimated based on other criteria. For example, a threshold range around a previous value (as discussed with reference to block 708) may be the sole determination of whether the input data stream is trending or flickering. Other criteria may also be used to estimate the current state of the input data stream.

Figure 8:
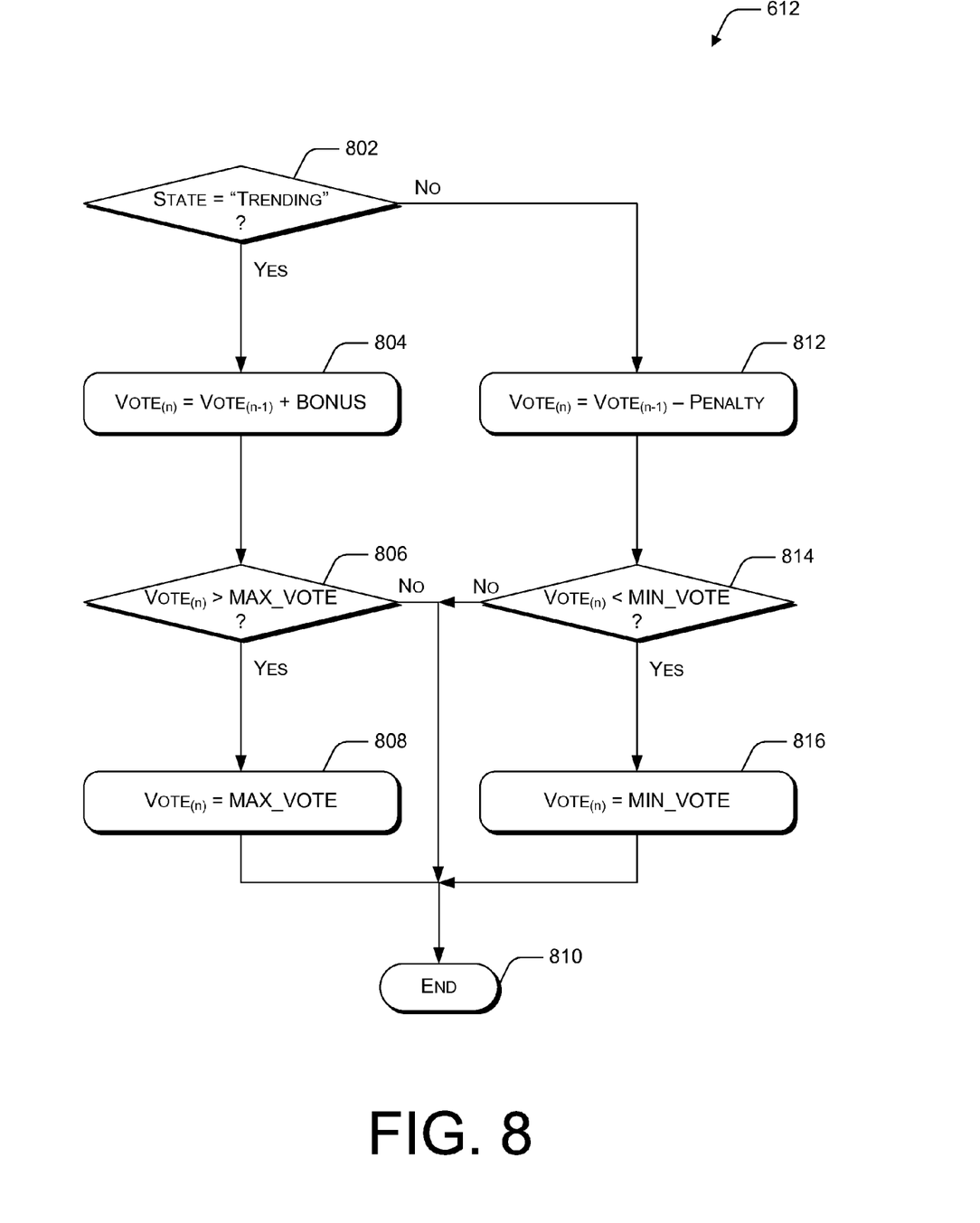
FIG. 8 is a flow diagram of an example method of calculating a vote based on a state of an input data stream.

FIG. 8 illustrates an example process 612 for calculating $VOTE_{(n)}$ based on the estimated state of the input data stream. At block 802, voting module 304 determines whether the input data stream is likely in a trending state (as discussed above with reference to FIG. 7). If it is determined that the input data stream is likely in a trending state (the "Yes" branch from block 802), then at block 804, $VOTE_{(n)}$ is calculated by adding a value to $VOTE_{(n-1)}$. In an example implementation, $VOTE_{(n-1)}$ is incremented by the value of BONUS. Setting BONUS to a value greater than one causes the value of α to increase more quickly when it is determined that the input data stream is likely in a trending state.

At block 806, voting module 304 compares $VOTE_{(n)}$ to MAX_VOTES. If $VOTE_{(n)}$ is greater than MAX_VOTES (the "Yes" branch from block 806), then at block 808, voting module 304 sets $VOTE_{(n)}$ equal to MAX_VOTES. The process ends at block 810.

If it is determined in block 802 that the input data stream is likely in a flickering state (the "No" branch from block 802), then at block 812, $VOTE_{(n)}$ is calculated by subtracting a value from $VOTE_{(n-1)}$. In an example implementation, voting module 304 calculates $VOTE_{(n)}$ by subtracting the PENALTY value from $VOTE_{(n-1)}$. Setting PENALTY to a value greater than one causes the value of α to decrease more quickly when it is determined that the input data stream is likely in a flickering state.

At block 814, voting module 304 compares $VOTE_{(n)}$ to MIN_VOTES. If $VOTE_{(n)}$ is less than MIN_VOTES (the "Yes" branch from block 814), then at block 816, $VOTE_{(n)}$ is set equal to MIN_VOTES. The process ends at block 810.

Figure 9:
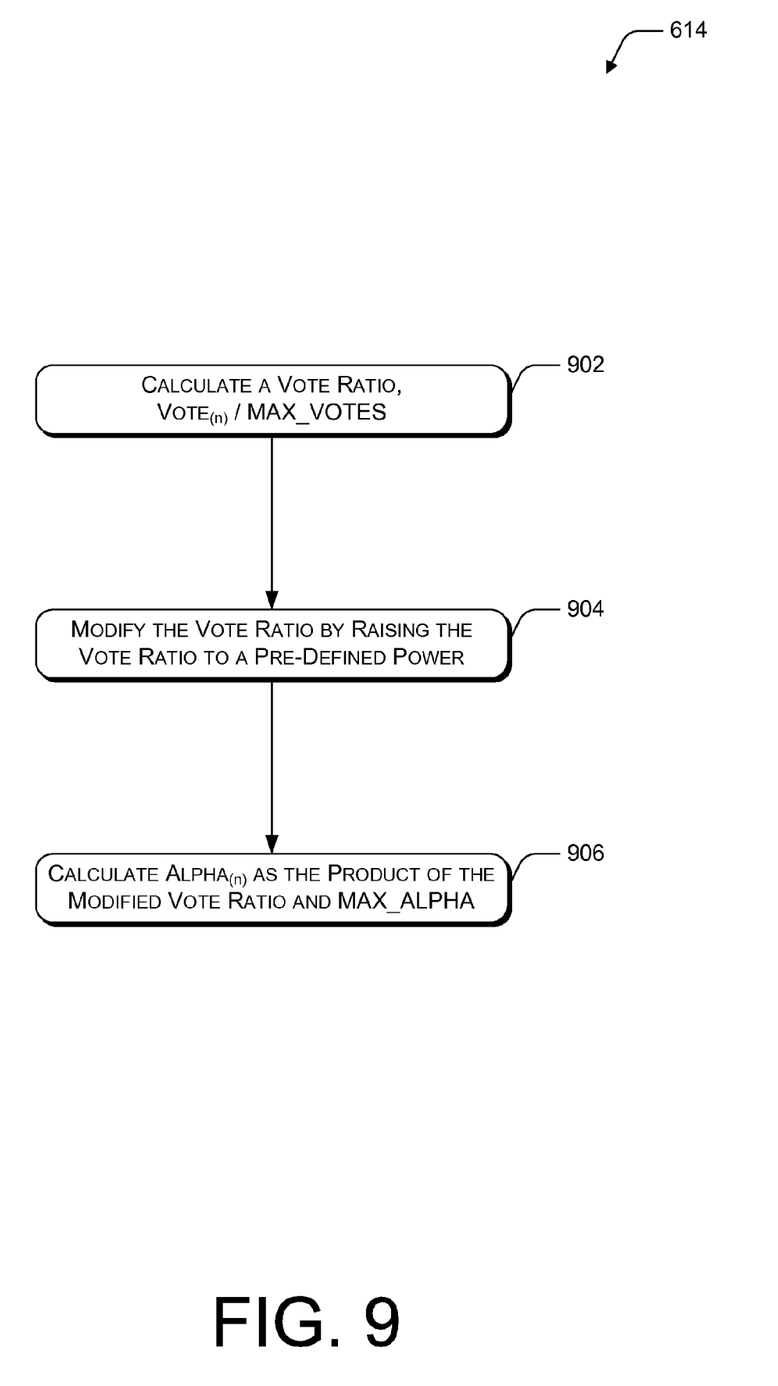
FIG. 9 is a flow diagram of an example method of dynamically modifying a smoothing factor, alpha.

FIG. 9 illustrates an example process 614 for calculating $ALPHA_{(n)}$ based on $VOTE_{(n)}$. As described above, dynamic alpha generator 306 calculates $ALPHA_{(n)}$ such that as $VOTE_{(n)}$ varies from MIN_VOTES to MAX_VOTES, $ALPHA_{(n)}$ varies from a minimum value (as calculated based on MIN_VOTES, MAX_VOTES, MAX_ALPHA, and POWER) to MAX_ALPHA.

At block 902, dynamic alpha generator 306 calculates a ratio of $VOTE_{(n)}$ to MAX_VOTES.

At block 904, dynamic alpha generator 306 raises the calculated vote ratio to a pre-defined POWER. If POWER equals one, then $ALPHA_{(n)}$ varies linearly from a minimum value to MAX_ALPHA as $VOTE_{(n)}$ varies from MIN_VOTES to MAX_VOTES. Alternatively, if POWER is equal to a value other than one, $ALPHA_{(n)}$ varies from a minimum value to MAX_ALPHA in a non-linear fashion. For example, if it is desired to quickly move out of a high smoothing phase, then an increase in votes should quickly cause α to increase and then taper off. Alternatively, it may be desired that votes should only minimally effect α in the early iterations, but then quickly move it toward MAX_ALPHA, indicating a preference to stay in a high-smoothing phase. Raising the vote ratio to a power other than one changes the behavior by which α varies from its minimum value to MAX_ALPHA.

At block 906, dynamic alpha generator 306 calculates $ALPHA_{(n)}$ as the product of the vote ratio (raised to the pre-defined POWER) and MAX_ALPHA. This can be expressed mathematically as:

$$\alpha_n = \left(\frac{VOTE_{(n)}}{MAX\_VOTES}\right)^{POWER} * MAX\_ALPHA$$

Example Clauses

A: A method comprising: receiving a first portion of an input data stream; generating a first portion of an output data stream by calculating an exponential moving average based, at least in part, on the first portion of the input data stream and a smoothing factor; receiving a second portion of the input data stream; determining a state of the input data stream; in response to determining that the input data stream is in a first state, incrementing a vote value; in response to determining that the input data stream is in a second state, decrementing the vote value; updating a value of the smoothing factor based on the vote value; and generating a second portion of the output data stream having reduced noise relative to the second portion of the input data stream by calculating an exponential moving average based, at least in part, on the first portion of the output data stream, the second portion of the input data stream, and the smoothing factor.

B: A method as paragraph A recites, wherein determining the state of the input data stream comprises: determining whether values from the input data stream are trending upward, trending downward, or flickering; in response to determining that the values from the input data stream are trending upward or trending downward, determining that the input data stream is in the first state; and in response to determining that the values from the input data stream are flickering, determining that the input data stream is in the second state.

C: A method as paragraph B recites, wherein determining whether values from the input data stream are trending upward, trending downward, or flickering comprises evaluating a difference between the second portion of the input data stream and the first portion of the output data stream.

D: A method as paragraph C recites, wherein evaluating the difference between the second portion of the input data stream and the first portion of the output data stream comprises: determining a first sign by determining whether the difference between the second portion of the input data stream and the first portion of the output data stream is positive or negative; determining a second sign by determining whether a difference between a previous portion of the input data stream and a previous portion of the output data stream was positive or negative; and in an event that the first sign and the second sign are different, determining that the values from the input data stream are flickering.

E: A method as paragraph D recites, wherein evaluating the difference between the second portion of the input data stream and the first portion of the output data stream further comprises: in response to determining that the first sign and the second sign are the same: determining whether the difference between the second portion of the input data stream and the first portion of the output data stream is within a threshold range of values; and in response to determining that the difference between the second portion of the input data stream and the first portion of the output data stream is within the threshold range of values, determining that the values from the input data stream are flickering; and in response to determining that the first sign and the second sign are not the same and the difference between the second portion of the input data stream and the first portion of the output data stream is not within the threshold range of values, determining that the values from the input data stream are trending upward or trending downward.

F: A method as any one of paragraphs A-E recite, wherein incrementing the vote value comprises: adding a vote increase constant value to the vote value to generate a new vote value; comparing the new vote value to a maximum vote value; and in response to the new vote value being greater than the maximum vote value, setting the new vote value equal to the maximum vote value.

G: A method as any one of paragraphs A-F recite, wherein decrementing the vote value comprises: subtracting a vote decrease constant value from the vote value to generate a new vote value; comparing the new vote value to a minimum vote value; and in response to the new vote value being less than the minimum vote value, setting the new vote value equal to the minimum vote value.

H: A method as either of paragraphs F or G recite, wherein the vote increase constant value is greater than one.

I: A method as any one of paragraphs F-H recite, wherein the vote decrease constant value is greater than one.

J: A method as any one of paragraphs A-I recite, wherein updating the value of the smoothing factor based on the vote value comprises: calculating a vote ratio by dividing the vote value by a maximum vote value; and calculating an updated smoothing factor as a product of the vote ratio and a maximum smoothing factor value.

K: A method as paragraph J recites, wherein updating the value of the smoothing factor based on the vote value further comprises raising the vote ratio to a pre-defined power prior to calculating the updated smoothing factor.

L: A computer-readable medium having computer-executable instructions thereon, the computer-executable instructions to configure a computer to perform a method as any one of paragraphs A-K recites.

M: A device comprising: one or more computer-readable media having computer-executable instructions thereon to configure a computer to perform a method as any one of paragraphs A-K recite, and a processing unit adapted to execute the instructions to perform the method as any one of paragraphs A-K recite.

N: A system comprising: one or more processors; a memory, communicatively coupled to the one or more processors; a voting module, stored in the memory and executed by the one or more processors to: determine a state of an input data stream; and selectively increment or decrement a total vote value based on the state of the input data stream; a dynamic alpha generator, stored in the memory and executed by the one or more processors, configured to calculate a value of a smoothing factor based, at least in part, on the total vote value; and an exponential moving average module, stored in the memory and executed by the one or more processors, configured to calculate an iteration of an exponential moving average based, at least in part, on the value of the smoothing factor.

O: A system as paragraph N recites, wherein: a first state indicates that values sampled from the input data stream are trending upward or trending downward; and a second state indicates that values sampled from the input data stream are remaining within a threshold range of values.

P: A system as paragraph O recites, wherein the threshold range of values is determined, at least in part, relative to a smoothed value calculated in a previous iteration of the exponential moving average.

Q: A system as either paragraph O or P recites, wherein: the voting module increments the total vote value in response to determining that the input data stream is in the first state; and the voting module decrements the total vote value in response to determining that the input data stream is determined to be in the second state.

R: A system as any one of paragraphs N-Q recites, wherein the voting module determines the state of the input data stream based, at least in part, on a calculated difference between a current sampled value from the input data stream and a smoothed value calculated in a previous iteration of the exponential moving average.

S: One or more computer-readable media comprising computer-executable instructions that, when executed, direct a computing system to: receive an input data stream comprising a plurality of sampled data values; and generate an output data stream comprising a plurality of smoothed data values having reduced noise relative to the input data stream by calculating multiple iterations of an exponential moving average algorithm, wherein: each iteration of the exponential moving average algorithm is calculated based on a current sampled data value, a previously calculated smoothed data value, and a smoothing factor; the smoothing factor is determined independently for each iteration of the exponential moving average algorithm; and for each iteration of the exponential moving average algorithm: a state of the input data stream is determined based, at least in part, on the current sampled data value; a total vote value is updated based on the state of the input data stream; and the smoothing factor for the current iteration of the exponential moving average algorithm is determined based, at least in part, on the total vote value.

T: One or more computer-readable media as paragraph S recites, wherein, the total vote value is restricted within a pre-defined range of vote values.

U: One or more computer-readable media as paragraph T recites, wherein, the smoothing factor is restricted within a pre-defined range of alpha values such that as the total vote value varies from a minimum vote value to a maximum vote value, the smoothing factor varies from a minimum alpha value to a maximum alpha value.

V: One or more computer-readable media as paragraph U recites, wherein, as the total vote value varies linearly from a minimum vote value to a maximum vote value, the smoothing factor varies non-linearly from a minimum alpha value to a maximum alpha value.

W: One or more computer-readable media as paragraph U recites, wherein, as the total vote value varies linearly from a minimum vote value to a maximum vote value, the smoothing factor varies linearly from a minimum alpha value to a maximum alpha value.

CONCLUSION

Although example democratic alpha smoothing has been described in language specific to structural features and/or methodological steps, it is to be understood that democratic alpha smoothing as defined in the appended claims is not necessarily limited to the specific features or steps described above. Rather, the specific features and steps described above are disclosed as examples of implementing the claims and other equivalent features and steps are intended to be within the scope of the claims.

The invention claimed is:

1. A method comprising:
receiving a first portion of an input data stream;
generating a first portion of an output data stream by calculating a first exponential moving average value based, at least in part, on the first portion of the input data stream and a smoothing factor;
receiving a second portion of the input data stream;
determining a state of the input data stream;
in response to determining that the state of the input data stream is a first state, incrementing a vote value;
in response to determining that the state of the input data stream is a second state, decrementing the vote value;
updating a value of the smoothing factor based on the vote value; and
generating a second portion of the output data stream having reduced noise relative to the second portion of the input data stream by calculating a second exponential moving average value based, at least in part, on the first portion of the output data stream, the second portion of the input data stream, and the smoothing factor.

2. A method as recited in claim 1, wherein determining the state of the input data stream comprises:
determining whether values from the input data stream are trending upward, trending downward, or flickering;
in response to determining that the values from the input data stream are trending upward or trending downward, determining that the input data stream is in the first state; and
in response to determining that the values from the input data stream are flickering, determining that the input data stream is in the second state.

3. A method as recited in claim 2, wherein determining whether values from the input data stream are trending upward, trending downward, or flickering comprises evaluating a difference between the second portion of the input data stream and the first portion of the output data stream.

4. A method as recited in claim 3, wherein evaluating the difference between the second portion of the input data stream and the first portion of the output data stream comprises:
determining a first sign by determining whether the difference between the second portion of the input data stream and the first portion of the output data stream is positive or negative;
determining a second sign by determining whether a difference between a previous portion of the input data stream and a previous portion of the output data stream was positive or negative; and
in an event that the first sign and the second sign are different, determining that the values from the input data stream are flickering.

5. A method as recited in claim 4, wherein evaluating the difference between the second portion of the input data stream and the first portion of the output data stream further comprises:
in response to determining that the first sign and the second sign are the same:
determining whether the difference between the second portion of the input data stream and the first portion of the output data stream is within a threshold range of values; and
in response to determining that the difference between the second portion of the input data stream and the first portion of the output data stream is within the threshold range of values, determining that the values from the input data stream are flickering; and
in response to determining that the first sign and the second sign are not the same and the difference between the second portion of the input data stream and the first portion of the output data stream is not within the threshold range of values, determining that the values from the input data stream are trending upward or trending downward.

6. A method as recited in claim 1, wherein incrementing the vote value comprises:
adding a constant value to the vote value to generate a new vote value;
comparing the new vote value to a maximum vote value; and
in response to the new vote value being greater than the maximum vote value, setting the new vote value equal to the maximum vote value.

7. A method as recited in claim 1, wherein decrementing the vote value comprises:
subtracting a constant value from the vote value to generate a new vote value;

comparing the new vote value to a minimum vote value; and in response to the new vote value being less than the minimum vote value, setting the new vote value equal to the minimum vote value.

8. A method as recited in claim 7, wherein the constant value is greater than one.

9. A method as recited in claim 1, wherein updating the value of the smoothing factor based on the vote value comprises:

calculating a vote ratio by dividing the vote value by a maximum vote value; and calculating an updated smoothing factor as a product of the vote ratio and a maximum smoothing factor value.

10. A method as recited in claim 9, wherein updating the value of the smoothing factor based on the vote value further comprises raising the vote ratio to a pre-defined power prior to calculating the updated smoothing factor.

11. A system, comprising:

one or more processors;

a memory, communicatively coupled to the one or more processors;

a voting module, stored in the memory and executed by the one or more processors, configured to:

determine a state of an input data stream; and selectively increment or decrement a total vote value based on the state of the input data stream;

a dynamic alpha generator, stored in the memory and executed by the one or more processors, configured to calculate a value of a smoothing factor based, at least in part, on the total vote value; and an exponential moving average module, stored in the memory and executed by the one or more processors, configured to calculate an iteration of an exponential moving average based, at least in part, on the value of the smoothing factor and a portion of the input data stream.

12. A system, as recited in claim 11, wherein:

a first state indicates that values sampled from the input data stream are trending upward or trending downward; and a second state indicates that values sampled from the input data stream are not trending upward or trending downward.

13. A system, as recited in claim 12, wherein the second state is determined based, at least in part, on a determination that values sampled from the input data stream are remaining within a threshold range of values.

14. A system, as recited in claim 12, wherein the threshold range of values is determined, at least in part, relative to a smoothed value calculated in a previous iteration of the exponential moving average.

15. A system, as recited in claim 12, wherein:

the voting module increments the total vote value in response to determining that the input data stream is in the first state; and the voting module decrements the total vote value in response to determining that the input data stream is in the second state.

16. A system, as recited in claim 11, wherein the voting module determines the state of the input data stream based, at least in part, on a calculated difference between a current sampled value from the input data stream and a smoothed value calculated in a previous iteration of the exponential moving average.

17. One or more computer storage media comprising computer-executable instructions that, when executed, direct a computing system to:

receive an input data stream comprising a plurality of sampled data values; and generate an output data stream comprising a plurality of smoothed data values having reduced noise relative to the input data stream by calculating multiple iterations of an exponential moving average algorithm, wherein:

each iteration of the exponential moving average algorithm is calculated based on a current sampled data value, a previously calculated smoothed data value, and a smoothing factor;

the smoothing factor is determined independently for each iteration of the exponential moving average algorithm; and for each iteration of the exponential moving average algorithm:

a state of the input data stream is determined based, at least in part, on the current sampled data value;

a total vote value is updated based on the state of the input data stream; and the smoothing factor for the current iteration of the exponential moving average algorithm is determined based, at least in part, on the total vote value.

18. One or more computer storage media as recited in claim 17, wherein, the total vote value is restricted within a pre-defined range of vote values.

19. One or more computer storage media as recited in claim 18, wherein, the smoothing factor is restricted within a pre-defined range of alpha values such that as the total vote value varies from a minimum vote value to a maximum vote value, the smoothing factor varies from a minimum alpha value to a maximum alpha value.

20. One or more computer storage media as recited in claim 19, wherein, as the total vote value varies linearly from a minimum vote value to a maximum vote value, the smoothing factor varies non-linearly from a minimum alpha value to a maximum alpha value.

* * * * *